(12) United States Patent
Fujita (10) Patent No.: US 12,475,533 B2
(45) Date of Patent: Nov. 18, 2025

(54) IMAGE PROCESSING APPARATUS, IMAGE PROCESSING METHOD, AND IMAGE PROCESSING PROGRAM

(71) Applicant: FUJIFILM Corporation, Tokyo (JP)

(72) Inventor: Jo Fujita, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 373 days.

(21) Appl. No.: 18/182,398

(22) Filed: Mar. 13, 2023

(65) Prior Publication Data

US 2023/0222638 A1 Jul. 13, 2023

Related U.S. Application Data

(63) Continuation of application No. PCT/JP2021/030472, filed on Aug. 19, 2021.

(30) Foreign Application Priority Data

Sep. 17, 2020 (JP) .................. 2020-156693

(51) Int. Cl.
- *G06T 5/50* (2006.01)
- *A61B 6/00* (2024.01)
- *G06T 7/11* (2017.01)

(52) U.S. Cl.
CPC ............ *G06T 5/50* (2013.01); *A61B 6/542* (2013.01); *G06T 7/11* (2017.01); *G06T 2207/10081* (2013.01); *G06T 2207/20221* (2013.01)

(58) Field of Classification Search
CPC ... G06T 5/50; G06T 7/11; G06T 2207/10081; G06T 2207/20221; A61B 6/542
See application file for complete search history.

(56) References Cited

U.S. PATENT DOCUMENTS

| 7,856,134 B2* | 12/2010 | Ruhrnschopf | A61B 6/4035 |
| | | | 382/128 |
| 8,194,824 B2* | 6/2012 | Takahashi | A61B 6/542 |
| | | | 378/108 |

(Continued)

FOREIGN PATENT DOCUMENTS

| EP | 3628214 | 4/2020 |
| EP | 3644282 | 4/2020 |

(Continued)

OTHER PUBLICATIONS

"International Search Report (Form PCT/ISA/210) of PCT/JP2021/030472", mailed on Oct. 26, 2021, with English translation thereof, pp. 1-7.

(Continued)

*Primary Examiner* — Gregory M Desire
(74) *Attorney, Agent, or Firm* — JCIPRNET (57) ABSTRACT

An image processing apparatus that acquires a plurality of radiographic images captured by irradiating a photographic subject with radiations at different tube voltages. From the plurality of radiographic images, the image processing apparatus generates, for a region of interest selected in the radiographic image, a first region image equivalent to an image to be obtained when a radiation at a first virtual tube voltage is radiated. From the plurality of radiographic images, the image processing apparatus generates, for an unselected region other than the region of interest in the radiographic image, a second region image equivalent to an image to be obtained when a radiation at a second virtual tube voltage according to a distance from the region of interest is radiated. The image processing apparatus generates a combined image obtained by combining the first region image and the second region image together.

9 Claims, 7 Drawing Sheets

(56) References Cited

U.S. PATENT DOCUMENTS

| | | | |
|---|---|---|---|
| 9,471,980 B2* | 10/2016 | Liu | A61B 6/461 |
| 9,532,759 B2 | 1/2017 | Taguchi et al. | |
| 9,734,574 B2* | 8/2017 | Sugiura | G06T 1/20 |
| 10,022,099 B2* | 7/2018 | Tsubota | A61B 6/4241 |
| 10,219,771 B2* | 3/2019 | Jung | A61B 6/545 |
| 11,097,129 B2* | 8/2021 | Sakata | G06T 11/005 |
| 11,295,487 B2* | 4/2022 | Sekiya | G06T 7/0012 |
| 2009/0147919 A1 | 6/2009 | Goto et al. | |
| 2014/0321603 A1 | 10/2014 | Taguchi et al. | |

FOREIGN PATENT DOCUMENTS

| | | |
|---|---|---|
| JP | 2005245657 | 9/2005 |
| JP | 2007044275 | 2/2007 |
| JP | 2011172803 | 9/2011 |
| JP | 2014061286 | 4/2014 |
| JP | 6261915 | 1/2018 |
| JP | 2020116283 | 8/2020 |

OTHER PUBLICATIONS

"Written Opinion of the International Searching Authority (Form PCT/ISA/237) of PCT/JP2021/030472", mailed on Oct. 26, 2021, with English translation thereof, pp. 1-6.

* cited by examiner

IMAGE PROCESSING APPARATUS, IMAGE PROCESSING METHOD, AND IMAGE PROCESSING PROGRAM

CROSS-REFERENCE TO RELATED APPLICATIONS

This application is a continuation application of International Application No. PCT/JP2021/030472, filed on Aug. 19, 2021, which is incorporated herein by reference in its entirety. Further, this application claims priority from Japanese Patent Application No. 2020-156693, filed on Sep. 17, 2020, the disclosure of which is incorporated by reference herein in their entirety.

BACKGROUND

Technical Field

The present disclosure relates to an image processing apparatus, an image processing method, and an image processing program.

Related Art

In the related art, a radiographic image is captured with an imaging apparatus such as a computed tomography (CT) apparatus. As techniques related to capturing of such a radiographic image, techniques for generating a combined image obtained by combining a plurality of radiographic images captured by irradiating a photographic subject with radiations at different tube voltages are known (see JP6261915B and JP2011-172803A).

SUMMARY

With the techniques for combining a plurality of radiographic images captured by irradiating a photographic subject with radiations at different tube voltages, a combined image can be used as a radiographic image that would be obtained if a radiation at any virtual tube voltage were radiated. Specifically, for example, by combining a first radiographic image captured by irradiating a photographic subject with a radiation at a tube voltage of 80 kVp and a second radiographic image captured by irradiating the photographic subject with a radiation at a tube voltage of 140 kVp together, a combined image below can be generated. That is, in this case, a combined image equivalent to an image to be obtained when a radiation at any virtual tube voltage is radiated, such as a radiographic image equivalent to an image to be obtained when a radiation at 40 keV is radiated or a radiographic image equivalent to an image to be obtained when a radiation at 100 keV is radiated, can be generated. Note that in these examples, the tube voltage in unit "kVp" represents a voltage of a peak of consecutive spectra at the time of actual image capturing, and the tube voltage in unit "keV" represents a voltage of a single spectrum at the time of generation of a combined image.

Thus, for example, by selecting a region of interest in a radiographic image and setting pixel values of the selected region of interest as pixel values in the case of a relatively low tube voltage, a contrast effect of the region of interest can be emphasized. In addition, by setting the pixel values of the selected region of interest as pixel values in the case of a relatively high tube voltage, noise in the region of interest can be reduced.

However, the techniques described in JP6261915B and JP2011-172803A do not take into account which tube voltage the pixel values in a region (hereinafter, referred to as an "unselected region") other than the selected region of interest correspond to.

Figure 1:
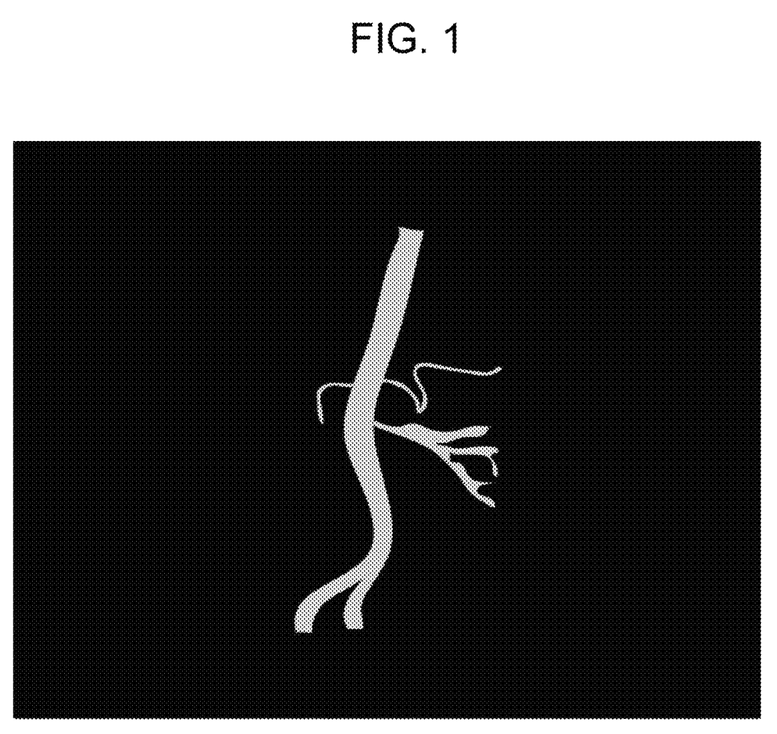
FIG. 1 is a diagram illustrating an example of a combined image obtained when only pixel values of selected regions of interest are set as pixel values corresponding to a designated tube voltage.

For example, when only the pixel values of the selected region of interest is set as pixel values corresponding to a designated tube voltage, a structure such as an organ that is present in the unselected region is not displayed as illustrated in FIG. 1 as an example. Thus, a positional relationship between the region of interest and the structure that is present in the unselected region is unknown. FIG. 1 illustrates an example in which a blood vessel region is selected.

Figure 2:
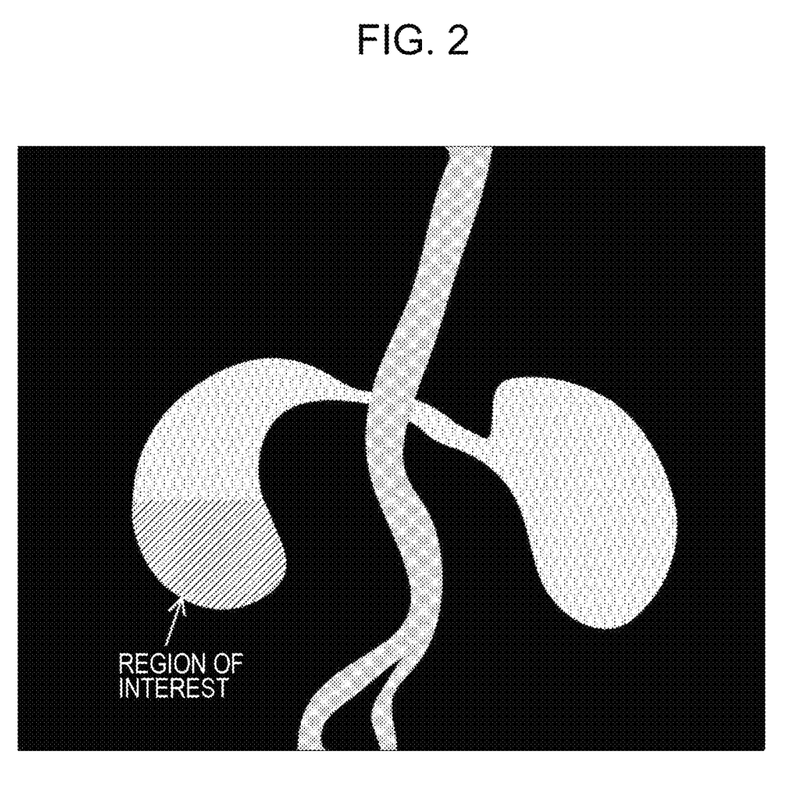
FIG. 2 is a diagram illustrating an example of a combined image obtained when pixel values of an unselected region are set as pixel values corresponding to a default tube voltage.

In contrast, pixel values of the unselected region are conceivably set as pixel values corresponding to a default tube voltage. In this case, as illustrated in FIG. 2 as an example, since the tube voltage abruptly changes between the region of interest and the unselected region, the pixel values also abruptly change. Consequently, an unnatural change in the pixel values occurs. FIG. 2 illustrates an example in which a partial region of the kidney is selected.

The present disclosure is made in view of the circumstances described above, and an object thereof is to provide an image processing apparatus, an image processing method, and an image processing program capable of suppressing an unnatural change in pixel values in a radiographic image.

An image processing apparatus according to the present disclosure is an image processing apparatus that generates, using a plurality of radiographic images captured by irradiating a photographic subject with radiations at different tube voltages, a combined image that is equivalent to an image to be obtained when a virtual tube voltage is radiated. The image processing apparatus includes at least one processor. The at least one processor is configured to acquire a plurality of radiographic images captured by irradiating a photographic subject with radiations at different tube voltages; acquire information representing at least one region of interest selected in a radiographic image among the plurality of radiographic images and a first virtual tube voltage for the region of interest; derive, for an unselected region other than the region of interest in the radiographic image, a second virtual tube voltage according to a distance from the region of interest; generate, for the region of interest, a first region image from the plurality of radiographic images, the first region image being equivalent to an image to be obtained when a radiation at the first virtual tube voltage is radiated; generate, for the unselected region, a second region image from the plurality of radiographic images, the second region image being equivalent to an image to be obtained when a radiation at the second virtual tube voltage is radiated; and generate a combined image obtained by combining the first region image and the second region image together.

In the image processing apparatus according to the present disclosure, the at least one processor may be configured to derive the second virtual tube voltage according to the distance from the region of interest, using a function that outputs a tube voltage value that increases as the distance from the region of interest increases.

In the image processing apparatus according to the present disclosure, the at least one processor may be configured to, in a case of acquiring information representing a plurality of the regions of interest, derive, for the unselected region, the second virtual tube voltage according to a distance from a closest region of interest among the plurality of regions of interest.

An image processing method according to the present disclosure is an image processing method to be executed by a processor included in an image processing apparatus that generates, using a plurality of radiographic images captured by irradiating a photographic subject with radiations at different tube voltages, a combined image that is equivalent to an image to be obtained when a virtual tube voltage is radiated. The image processing method includes acquiring a plurality of radiographic images captured by irradiating a photographic subject with radiations at different tube voltages; acquiring information representing at least one region of interest selected in a radiographic image among the plurality of radiographic images and a first virtual tube voltage for the region of interest; deriving, for an unselected region other than the region of interest in the radiographic image, a second virtual tube voltage according to a distance from the region of interest; generating, for the region of interest, a first region image from the plurality of radiographic images, the first region image being equivalent to an image to be obtained when a radiation at the first virtual tube voltage is radiated; generating, for the unselected region, a second region image from the plurality of radiographic images, the second region image being equivalent to an image to be obtained when a radiation at the second virtual tube voltage is radiated; and generating a combined image obtained by combining the first region image and the second region image together.

An image processing program according to the present disclosure is an image processing program to be executed by a processor included in an image processing apparatus that generates, using a plurality of radiographic images captured by irradiating a photographic subject with radiations at different tube voltages, a combined image that is equivalent to an image to be obtained when a virtual tube voltage is radiated. The image processing program including acquiring a plurality of radiographic images captured by irradiating a photographic subject with radiations at different tube voltages; acquiring information representing at least one region of interest selected in a radiographic image among the plurality of radiographic images and a first virtual tube voltage for the region of interest; deriving, for an unselected region other than the region of interest in the radiographic image, a second virtual tube voltage according to a distance from the region of interest; generating, for the region of interest, a first region image from the plurality of radiographic images, the first region image being equivalent to an image to be obtained when a radiation at the first virtual tube voltage is radiated; generating, for the unselected region, a second region image from the plurality of radiographic images, the second region image being equivalent to an image to be obtained when a radiation at the second virtual tube voltage is radiated; and generating a combined image obtained by combining the first region image and the second region image together.

According to the present disclosure, an unnatural change in pixel values in a radiographic image can be suppressed.

DETAILED DESCRIPTION

An exemplary embodiment for implementing a technique of the present disclosure will be described in detail below with reference to the drawings.

Figure 3:
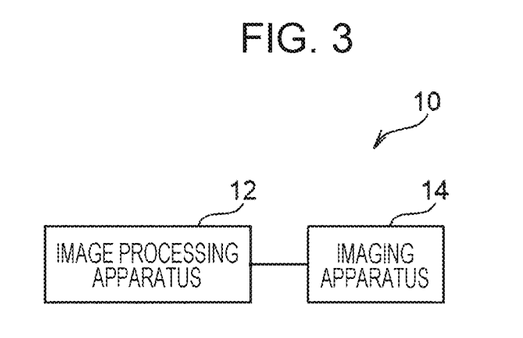
FIG. 3 is a schematic configuration diagram of a radiographic image capturing system.

First, a configuration of a radiographic image capturing system 10 according to the present embodiment will be described with reference to FIG. 3. As illustrated in FIG. 3, the radiographic image capturing system 10 includes an image processing apparatus 12 and an imaging apparatus 14. Examples of the image processing apparatus 12 include a server computer or the like. The image processing apparatus 12 and the imaging apparatus 14 are connected to each other to be able to communicate with each other via a network.

The imaging apparatus 14 is an imaging apparatus that captures a radiographic image by irradiating a photographic subject with a radiation. The imaging apparatus 14 according to the present embodiment is capable of capturing a plurality of radiographic images by irradiating a photographic subject with radiations at different tube voltages. Specifically, the imaging apparatus 14 applies a first tube voltage (for example, 80 kVp) to a radiation source to irradiate a photographic subject with a radiation, and captures a first radiographic image based on the radiation that has passed through the photographic subject. The imaging apparatus 14 then applies a second tube voltage (for example, 140 kVp), which is higher than the first tube voltage, to the radiation source to irradiate the photographic subject with a radiation, and captures a second radiographic image based on the radiation that has passed through the photographic subject. In the present embodiment, a case will be described where a computed tomography (CT) apparatus is used as the imaging apparatus 14. That is, the first radiographic image and the second radiographic image according to the present embodiment are CT images.

The image processing apparatus 12 generates, using a plurality of radiographic images captured by irradiating a photographic subject with radiations at different tube voltages, a combined image that is equivalent to an image to be obtained when a radiation at a virtual tube voltage is radiated.

Figure 4:
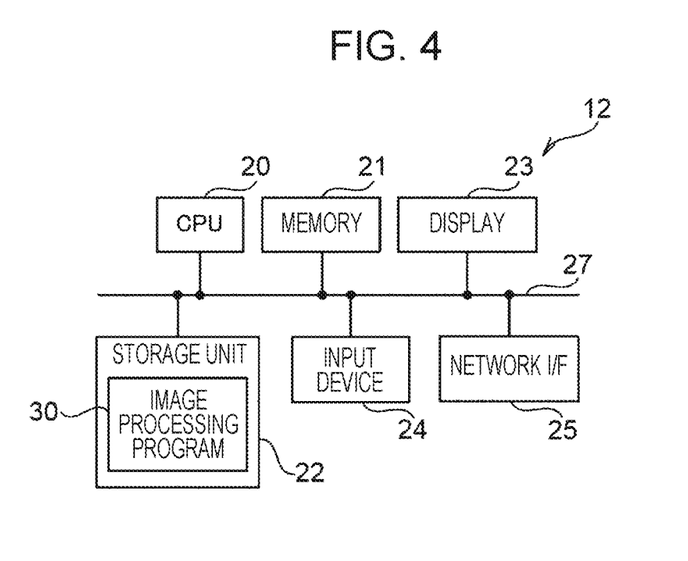
FIG. 4 is a block diagram illustrating an example of a hardware configuration of an image processing apparatus.

A hardware configuration of the image processing apparatus 12 according to the present embodiment will be described next with reference to FIG. 4. As illustrated in FIG. 4, the image processing apparatus 12 includes a central processing unit (CPU) 20, a memory 21 serving as a temporary storage area, and a storage unit 22 that is non-volatile. The image processing apparatus 12 also includes a display 23 such as a liquid crystal display, an input device 24 such as a keyboard and a mouse, and a network interface (I/F) 25 to be connected to a network. The CPU 20, the memory 21, the storage unit 22, the display 23, the input device 24, and the network I/F 25 are connected to a bus 27.

The storage unit 22 is implemented by a hard disk drive (HDD), a solid state drive (SSD), a flash memory, or the like. An image processing program 30 is stored in the storage unit 22 serving as a storage medium. The CPU 20 reads out the image processing program 30 from the storage unit 22, loads the image processing program 30 into the memory 21, and executes the loaded image processing program 30.

Figure 5:
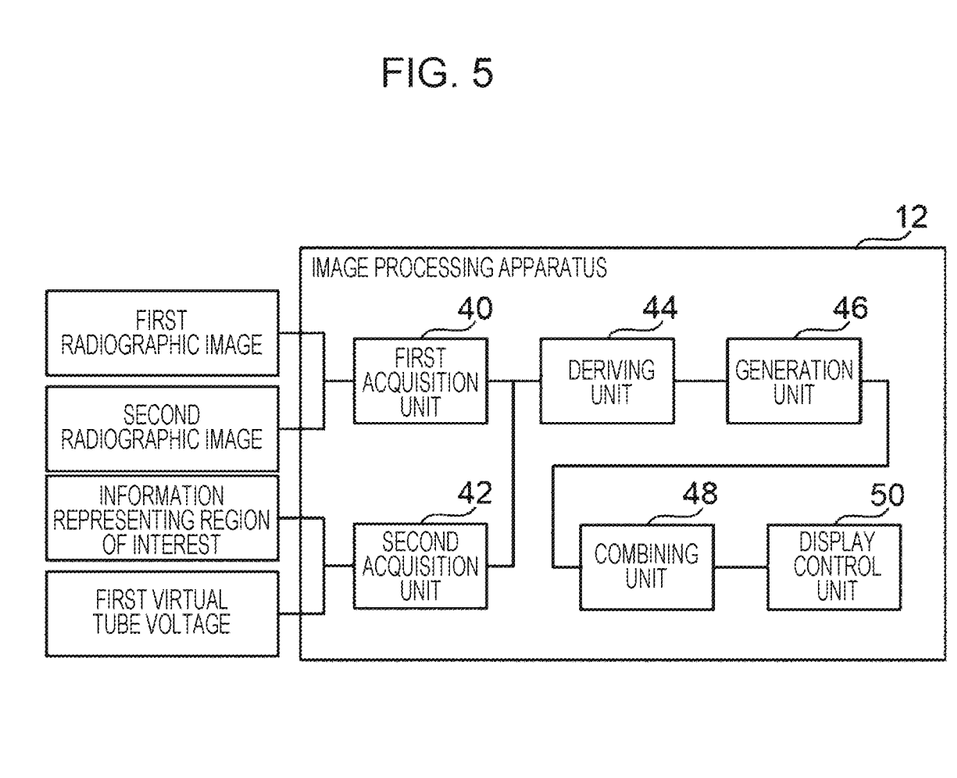
FIG. 5 is a block diagram illustrating an example of a functional configuration of the image processing apparatus.

A functional configuration of the image processing apparatus 12 according to the present embodiment will be described next with reference to FIG. 5. As illustrated in FIG. 5, the image processing apparatus 12 includes a first acquisition unit 40, a second acquisition unit 42, a deriving unit 44, a generation unit 46, a combining unit 48, and a display control unit 50. The CPU 20 executes the image processing program 30 to function as the first acquisition unit 40, the second acquisition unit 42, the deriving unit 44, the generation unit 46, the combining unit 48, and the display control unit 50.

The first acquisition unit 40 acquires the first radiographic image and the second radiographic image captured by the imaging apparatus 14.

The user selects, via the input device 24, at least one region of interest in the first radiographic image or the second radiographic image displayed as a two-dimensional image on the display 23. The user also inputs, via the input device 24, a first virtual tube voltage for the selected region of interest. When the user selects a plurality of regions of interest, the user inputs the first virtual tube voltage for each of the regions of interest. For example, when the user desires to emphasize the contrast effect in the region of interest, the user inputs a relatively low tube voltage as the first virtual tube voltage. On the other hand, for example, when the user desires to reduce noise in the region of interest, the user inputs a relatively high tube voltage as the first virtual tube voltage.

The second acquisition unit 42 acquires information representing the at least one region of interest selected by the user as described above and the first virtual tube voltage for the region of interest input by the user as described above.

Figure 6:
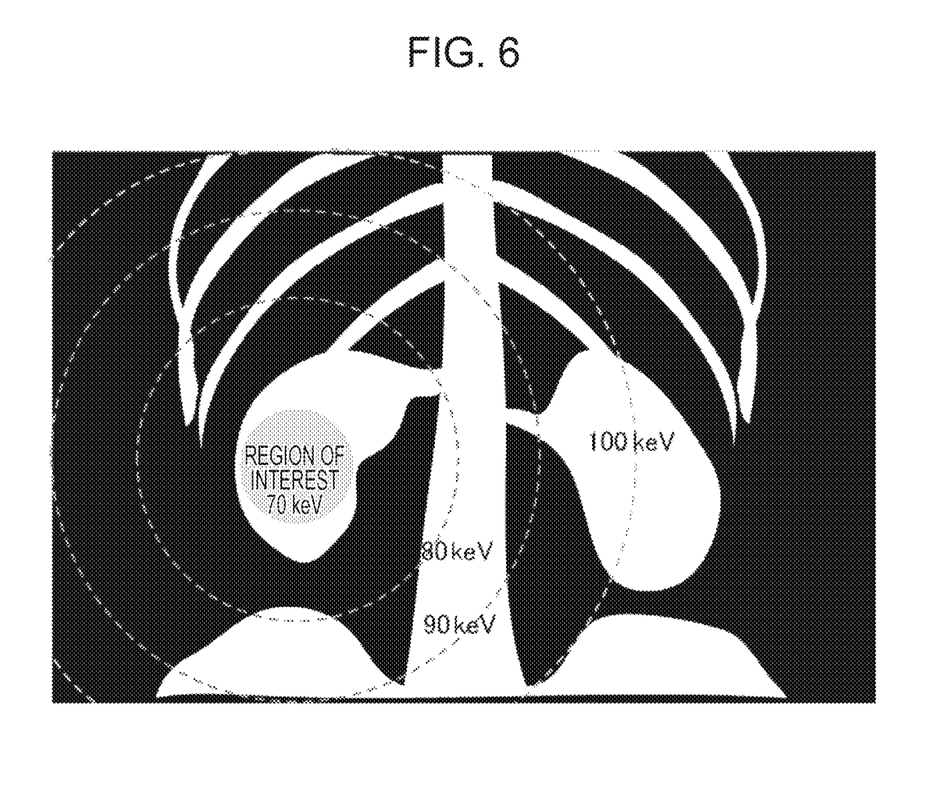
FIG. 6 is a diagram for describing a method of deriving a virtual tube voltage for a region other than a region of interest.

The deriving unit 44 derives, for an unselected region other than the region of interest in the first radiographic image or the second radiographic image, a second virtual tube voltage according to a distance from the region of interest. Specifically, the deriving unit 44 derives the second virtual tube voltage according to a distance from a centroid of the region of interest, using a function that outputs a tube voltage value that increases as the distance from the centroid of the region of interest increases. Thus, as illustrated in FIG. 6 as an example, the second virtual tube voltage for the unselected region becomes a voltage of a value that increases as the distance from the centroid of the region of interest increases, with respect to the first virtual tube voltage. In the example of FIG. 6, the first virtual tube voltage for the region of interest is 70 keV, and positions where the second virtual tube voltage for the unselected region becomes equal to 80 keV, 90 keV, and 100 keV are represented by respective broken lines.

The deriving unit 44 may derive the second virtual tube voltage according to the distance from the region of interest, using, for example, a look-up table in which the distance from the region of interest and the tube voltage are associated with each other, instead of the function described above.

Figure 7:
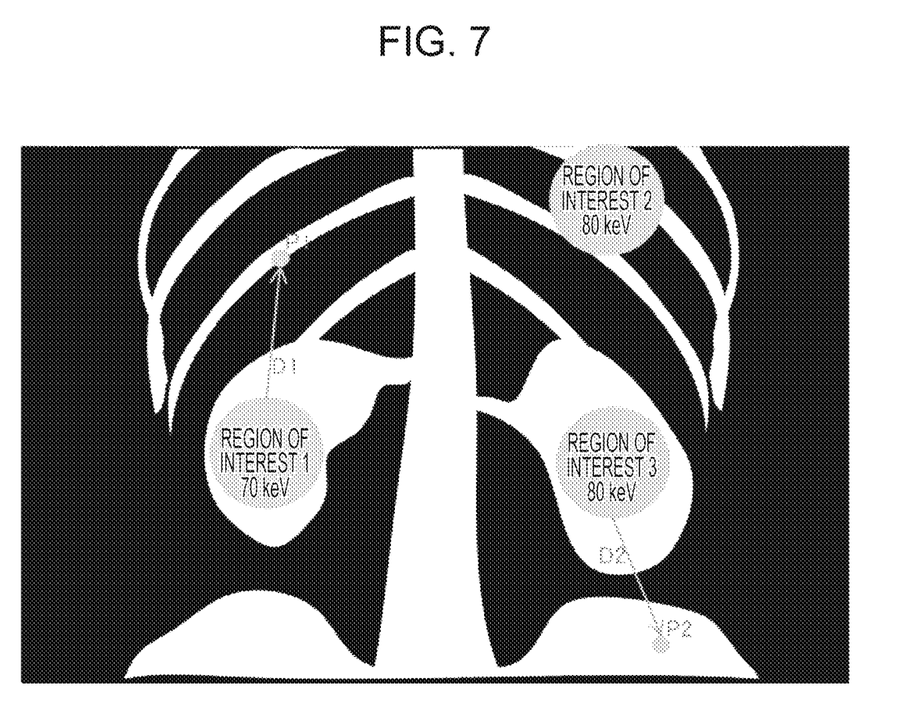
FIG. 7 is a diagram for describing a method of deriving a virtual tube voltage for a region other than a plurality of regions of interest when the plurality of regions of interest are present.

When the second acquisition unit 42 acquires information representing a plurality of regions of interest, the deriving unit 44 derives, for the unselected region, the second virtual tube voltage according to a distance from a closest region of interest among the plurality of regions of interest. In one example, for a position P1 in the unselected region illustrated in FIG. 7, the deriving unit 44 derives the second virtual tube voltage according to a distance D1 from a closest region of interest 1 among regions of interest 1 to 3. For a position P2 in the unselected region illustrated in FIG. 7, the deriving unit 44 derives the second virtual tube voltage according to a distance D2 from the closest region of interest 3 among the regions of interest 1 to 3.

For the region of interest, the generation unit 46 generates, from the first radiographic image and the second radiographic image, a first region image equivalent to an image to be obtained when a radiation at the first virtual tube voltage is radiated. For the unselected region, the generation unit 46 generates, from the first radiographic image and the second radiographic image, a second region image equivalent to an image to be obtained when a radiation at the second virtual tube voltage is radiated.

A method of generating an image equivalent to an image to be obtained when a radiation at any virtual tube voltage is radiated will be described below. By performing a weighted calculation using two linear attenuation coefficients on two CT images, a CT image equivalent to an image to be obtained when a radiation at any virtual tube voltage is radiated can be generated.

A linear attenuation coefficient and a CT number have a relationship of Equation (1) below. $\mu_{water}$ in Equation (1) denotes a linear attenuation coefficient of water and is a known value.

$$CT \text{ number} = \frac{\mu - \mu_{water}}{\mu_{water}} \times 1000 \tag{1}$$

First, it is assumed that a given substance is made of two base substances. Since water and iodine are often used as the two base substances, an example of using water and iodine as the two base substances will be described herein.

A linear attenuation coefficient μ at any tube voltage $E_i$ can be represented by Equation (2) below in which a product of a linear attenuation coefficient μ and a density C of water and a product of a linear attenuation coefficient μ and a density C of iodine, where water and the iodine are the two base substances, are added together.

$$\mu(E_i) = C_{water} \times \mu_{water}(E_i) + C_{iodine} \times \mu_{iodine}(E_i) \tag{2}$$

The linear attenuation coefficients $\mu_{water}$ and $\mu_{iodine}$ of water and iodine at the any tube voltage $E_i$ are known. Thus, if the densities $C_{water}$ and $C_{iodine}$ of water and iodine are known, the linear attenuation coefficient at the any tube voltage Ei can be determined.

The first radiographic image and the second radiographic image are used to determine the densities $C_{water}$ and $C_{iodine}$ of water and iodine. It is assumed that the first radiographic image is captured at a tube voltage $E_1$, and the second radiographic image is captured at a tube voltage $E_2$.

Linear attenuation coefficients $\mu_1$ and $\mu_2$ are determined from the first radiographic image and the second radiographic image in accordance with equation (1). From Equation (2), simultaneous equations represented by Equations (3) and (4) below hold.

$$\mu(E_1) = C_{water} \times \mu_{water}(E_1) + C_{iodine} \times \mu_{iodine}(E_1) \tag{3}$$

$$\mu(E_2) = C_{water} \times \mu_{water}(E_2) + C_{iodine} \times \mu_{iodine}(E_2) \tag{4}$$

By solving these simultaneous equations, the density $C_{water}$ of water and the density $C_{iodine}$ of iodine, which are unknown quantities, are determined. Since the densities $C_{water}$ and $C_{iodine}$ of water and iodine are determined, the linear attenuation coefficient at the any virtual tube voltage can be determined in accordance with equation (2). Once the linear attenuation coefficient at the any tube voltage Ei can be determined, the CT number at the any virtual tube voltage can be determined in accordance with equation (1).

Figure 8:
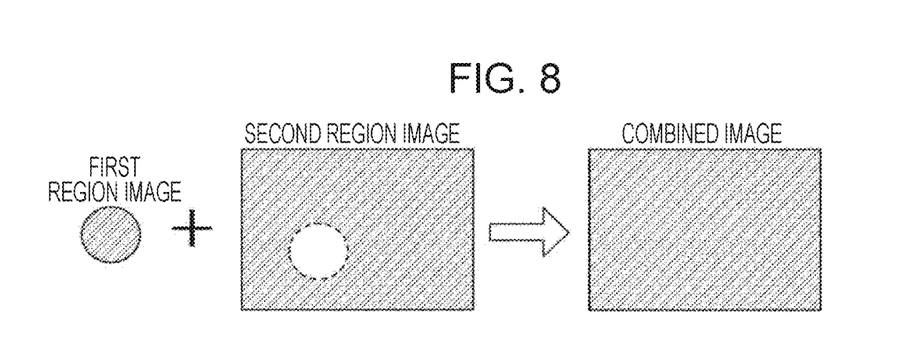
FIG. 8 is a diagram for describing a combined image.

The combining unit 48 generates a combined image obtained by combining the first region image and the second region image generated by the generation unit 46 together. The display control unit 50 performs control to display the combined image generated by the combining unit 48 on the display 23. With the configuration described above, the first region image is generated for the region of interest, the second region image is generated for the unselected region, and the combined image obtained by combining the first region image and the second region image together is generated, as illustrated in FIG. 8 as an example.

Figure 9:
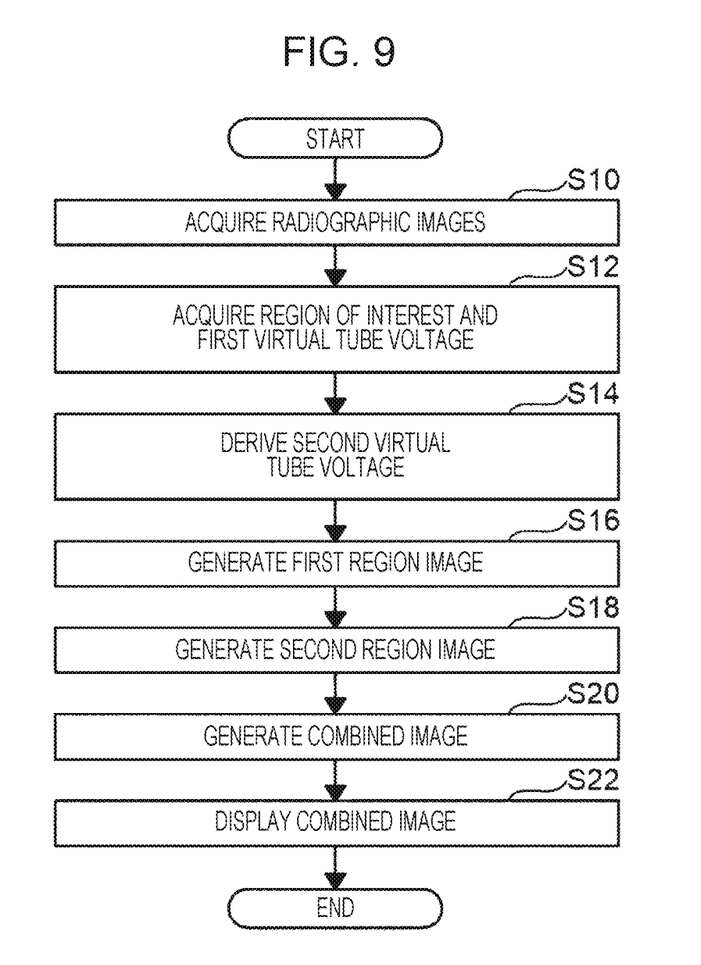
FIG. 9 is a flowchart illustrating an example of an image generation process.

An operation of the image processing apparatus 12 according to the present embodiment will be described next with reference to FIG. 9. The CPU 20 executes the image processing program 30, so that an image generation process illustrated in FIG. 9 is performed. The image generation process illustrated in FIG. 9 is performed, for example, in response to a user inputting an instruction to start the execution via the input device 24.

In step S10 in FIG. 9, the first acquisition unit 40 acquires the first radiographic image and the second radiographic image captured by the imaging apparatus 14. In step S12, the second acquisition unit 42 acquires information representing at least one region of interest selected by the user and the first virtual tube voltage for the region of interest input by the user, as described above.

In step S14, the deriving unit 44 derives, for an unselected region other than the region of interest represented by the information acquired in step S12, the second virtual tube voltage according to the distance from the region of interest, as described above. In step S16, for the region of interest, the generation unit 46 generates, from the first radiographic image and the second radiographic image, the first region image equivalent to an image to be obtained when a radiation at the first virtual tube voltage is radiated. In step S18, for the unselected region, the generation unit 46 generates, from the first radiographic image and the second radiographic image, the second region image equivalent to an image to be obtained when a radiation at the second virtual tube voltage is radiated.

In step S20, the combining unit 48 generates a combined image obtained by combining the first region image generated in step S16 and the second region image generated in step S18 together. In step S22, the display control unit 50 performs control to display the combined image generated in step S20 on the display 23. In response to the end of the processing of step S22, the image generation process ends.

As described above, according to the present embodiment, the first region image corresponding to the designated first virtual tube voltage is generated for the region of interest, and the second region image corresponding to the second virtual tube voltage according to the distance from the region of interest is generated for the region other than the region of interest. The combined image obtained by combining the first region image and the second region image together is then generated. Thus, an abrupt change in the tube voltage in the combined image is suppressed. Consequently, an unnatural change in pixel values in a radiographic image can be suppressed.

In the embodiment described above, for example, various processors mentioned below can be used as a hardware structure of processing units that perform various processes, such as the first acquisition unit 40, the second acquisition unit 42, the deriving unit 44, the generation unit 46, the combining unit 48, and the display control unit 50. The aforementioned various processors include, in addition to a CPU which is a general-purpose processor that executes software (program) to function as the various processing units as described above, a programmable logic device (PLD), such as a field programmable gate array (FPGA), which is a processor whose circuitry is changeable after production; a dedicated electric circuit, such as an application specific integrated circuit (ASIC), which is a processor having circuitry designed exclusively for executing specific processing; and the like.

A single processing unit may be constituted by one of these various processors, or by a combination of two or more processors of the same kind or different kinds (for example, a combination of a plurality of FPGAs or a combination of a CPU and an FPGA). In addition, a plurality of processing units may be constituted by a single processor.

Examples in which the plurality of processing units are constituted by a single processor include a first configuration, as exemplified by computers such as a server and a client, in which a combination of one or more CPUs and software constitutes the single processor and this processor functions as the plurality of processing units. The examples also include a second configuration, as exemplified by a System on Chip (SoC) or the like, in which the processor that implements functions of the entire system including the plurality of processing units on a single integrated circuit (IC) chip is used. As described above, the various processing units are constituted using one or more of the various processors above in terms of the hardware structure.

More specifically, electric circuitry in which circuit elements such as semiconductor elements are combined can be used in terms of the hardware structure of these various processors.

In the embodiment above, the configuration has been described in which the image processing program 30 is stored (installed) in the storage unit 22 in advance. However, the configuration is not limited to this. The image processing program 30 may be provided in a form of a recording medium, such as a compact disc read-only memory (CD-ROM), a digital versatile disc read-only memory (DVD-ROM), or a Universal Serial Bus (USB) memory, on which the image processing program 30 is recorded. The image processing program 30 may also be downloaded from an external apparatus via a network.

What is claimed is:
1. An image processing apparatus comprising:
at least one processor, the at least one processor being configured to:
acquire a plurality of radiographic images captured by irradiating a photographic subject with radiations at different tube voltages;
acquire information representing at least one region of interest selected in at least one radiographic image among the plurality of radiographic images and a first virtual tube voltage for the region of interest;
derive, for an unselected region other than the region of interest in the at least one radiographic image, a second virtual tube voltage according to a distance from the region of interest;
generate, for the region of interest, a first region image from the plurality of radiographic images, the first region image being equivalent to an image to be obtained when a radiation at the first virtual tube voltage is radiated;
generate, for the unselected region, a second region image from the plurality of radiographic images, the second region image being equivalent to an image to be obtained when a radiation at the second virtual tube voltage is radiated; and
generate a combined image obtained by combining the first region image and the second region image together.

2. The image processing apparatus according to claim 1, wherein the at least one processor is configured to
derive the second virtual tube voltage according to the distance from the region of interest, using a function that outputs a tube voltage value that increases as the distance from the region of interest increases.

3. The image processing apparatus according to claim 1, wherein the at least one processor is configured to
in a case of acquiring information representing a plurality of the regions of interest, derive, for the unselected region, the second virtual tube voltage according to a distance from a closest region of interest among the plurality of regions of interest.

4. An image processing method comprising:
by a processor of an image processing apparatus,
acquiring a plurality of radiographic images captured by irradiating a photographic subject with radiations at different tube voltages;
acquiring information representing at least one region of interest selected in at least one radiographic image among the plurality of radiographic images and a first virtual tube voltage for the region of interest;
deriving, for an unselected region other than the region of interest in the at least one radiographic image, a second virtual tube voltage according to a distance from the region of interest;
generating, for the region of interest, a first region image from the plurality of radiographic images, the first region image being equivalent to an image to be obtained when a radiation at the first virtual tube voltage is radiated;
generating, for the unselected region, a second region image from the plurality of radiographic images, the second region image being equivalent to an image to be obtained when a radiation at the second virtual tube voltage is radiated; and
generating a combined image obtained by combining the first region image and the second region image together.

5. The image processing method of claim 4, wherein
the second virtual tube voltage is derived according to the distance from the region of interest, using a function that outputs a tube voltage value that increases as the distance from the region of interest increases.

6. The image processing method of claim 4, wherein
in a case of acquiring information representing a plurality of regions of interest, for the unselected region, the second virtual tube voltage is derived according to a distance from a closest region of interest among the plurality of regions of interest.

7. A non-transitory computer-readable storage medium storing an image processing program executable by a processor to perform an image processing, the image processing comprising:
acquiring a plurality of radiographic images captured by irradiating a photographic subject with radiations at different tube voltages;
acquiring information representing at least one region of interest selected in at least one radiographic image among the plurality of radiographic images and a first virtual tube voltage for the region of interest;
deriving, for an unselected region other than the region of interest in the at least one radiographic image, a second virtual tube voltage according to a distance from the region of interest;
generating, for the region of interest, a first region image from the plurality of radiographic images, the first region image being equivalent to an image to be obtained when a radiation at the first virtual tube voltage is radiated;
generating, for the unselected region, a second region image from the plurality of radiographic images, the second region image being equivalent to an image to be obtained when a radiation at the second virtual tube voltage is radiated; and
generating a combined image obtained by combining the first region image and the second region image together.

8. The non-transitory computer-readable storage medium of claim 7, wherein
the second virtual tube voltage is derived according to the distance from the region of interest, using a function that outputs a tube voltage value that increases as the distance from the region of interest increases.

9. The non-transitory computer-readable storage medium of claim 7, wherein
in a case of acquiring information representing a plurality of regions of interest, for the unselected region, the second virtual tube voltage is derived according to a distance from a closest region of interest among the plurality of regions of interest.

* * * * *